United States Patent
Fablet et al.

(10) Patent No.: US 10,110,507 B2
(45) Date of Patent: Oct. 23, 2018

(54) PUSH-BASED TRANSMISSION OF RESOURCES AND CORRELATED NETWORK QUALITY ESTIMATION

(71) Applicant: CANON KABUSHIKI KAISHA, Tokyo (JP)

(72) Inventors: Youenn Fablet, La Dominelais (FR); Romain Bellessort, Rennes (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 14/807,002

(22) Filed: Jul. 23, 2015

(65) Prior Publication Data

US 2016/0028646 A1    Jan. 28, 2016

(30) Foreign Application Priority Data

Jul. 25, 2014 (GB) .................................. 1413254.2

(51) Int. Cl.
*G06F 15/173* (2006.01)
*H04L 12/911* (2013.01)
*H04L 12/927* (2013.01)

(52) U.S. Cl.
CPC .............. *H04L 47/78* (2013.01); *H04L 47/80* (2013.01)

(58) Field of Classification Search
CPC ................................ H04L 47/78; H04L 47/80
See application file for complete search history.

(56) References Cited

U.S. PATENT DOCUMENTS

| | | | | |
|---|---|---|---|---|
| 9,628,543 B2* | 4/2017 | Lim | ........................ | H04L 67/02 |
| 2010/0313159 A1* | 12/2010 | Decker | ............. | G06F 17/30899 |
| | | | | 715/772 |
| 2014/0108495 A1* | 4/2014 | Benno | .............. | H04N 21/23406 |
| | | | | 709/203 |
| 2014/0274322 A1* | 9/2014 | McDonald | .......... | G07F 17/3225 |
| | | | | 463/25 |
| 2015/0271233 A1* | 9/2015 | Bouazizi | ................. | H04L 65/60 |
| | | | | 709/219 |
| 2018/0007027 A1* | 1/2018 | Chizhov | ............... | H04L 63/029 |

FOREIGN PATENT DOCUMENTS

WO         2014/012015 A2    1/2014

* cited by examiner

*Primary Examiner* — Michael A Keller
(74) *Attorney, Agent, or Firm* — Canon U.S.A., Inc. IP Division (57) ABSTRACT

The present invention relates generally to network quality estimation using HTTP/2 push feature. When network quality estimation is required, a client web application requests a server to enter a probing mode. During the probing mode, the server pushes useful data to the application for the latter to perform the estimation. This avoids wasting bandwidth since the useful data are likely to be used by the application. Furthermore, during the probing mode, the server notifies the application of the push start and the push end of each pushed data. This is one using a web socket established with the application. This makes it possible to overcome the limitations of the application in accessing HTTP/2 features of a client browser. Based on the notifications, the application is able to perform accurate estimations.

28 Claims, 3 Drawing Sheets

PUSH-BASED TRANSMISSION OF RESOURCES AND CORRELATED NETWORK QUALITY ESTIMATION

This application claims priority from United Kingdom Patent Application No. 1413254.2 filed on Jul. 25, 2014. The above cited patent application is incorporated herein by reference in its entirety.

FIELD OF THE INVENTION

The present invention relates generally to communication networks and more specifically to a method for a server device to provide resources to a client device, and a correlated method of communicating with a server device, which methods uses a push feature.

The invention particularly applies to the processing of HTTP/2 exchanges which is described below for ease of explanation.

BACKGROUND OF THE INVENTION

HTTP/2 is a new version of the HTTP protocol currently being specified by the IETF (see HTTP version 2, Internet draft dated Feb. 13, 2014, available at http://tools.ietf.org/html/draft-ietf-httpbis-http2-10).

It is well-known that the HTTP protocol allows a client device and a server device to communicate through the exchange of requests and responses. Conventionally, requests are sent by the client device to the server device, which in return, sends responses.

As defined by the IETF, the HTTP requests and responses are transmitted over a TCP connection established between the client and server devices.

The earliest versions of HTTP relied on different TCP connections to respectively convey each pair of (request, response).

The most recent versions of HTTP allow reusing the same TCP connection to exchange a plurality of pairs of (request, response).

In the particular case of HTTP/2, one and the same TCP connection is used between the client and server devices to exchange all the requests and responses. This makes it possible for HTTP/2 to multiplex requests and responses and even to intermingle parts of them. For instance, the client device may start sending a first request, then sends a second request, and then finishes sending its first request. On the other side, the server device may respond to the requests from the client device in any order, for example by intermingling parts of different responses.

To handle efficiently each pair of request and response, and thus to allow efficient multiplexing, HTTP/2 uses a stream identifier (ID), usually a 31-bit integer value, to identify each of the pairs. A stream can be seen as a bidirectional channel between the client and server devices used to exchange one request and the corresponding response in the established TCP connection.

Each time a new request is sent by the client device, a new stream is created. The request is sent through one or more HTTP/2 frames as defined in the above publication, each of them storing the corresponding stream ID in its frame header. The above multiplexing thus consists in multiplexing such HTTP/2 streams within the same TCP connection.

A stream is usually closed once the response associated with a given request has been received by the client device that originated said request. The closure of the stream means that the stream ID is made available for a new request/response exchange.

Since the stream is provided for a single request and the corresponding response, the words "stream" and "request" or "stream" and "response" are used without distinction in the description below because the processing of a request/response by any of the client and server devices means the same as the processing of the corresponding stream by the same device.

HTTP/2 has also introduced a new feature for transmitting data from the server device to the client device, namely the Push feature.

This feature enables the server device to send, under certain circumstances, a resource (i.e. data) to the client device even if the client device has not requested the resource. In this case, it is said that the resource is pushed to the client device.

Pushing a resource is useful as it enables the client device to obtain more quickly the different resources it needs, typically to render a web page.

This is because web pages generally contain links to other resources, which themselves may contain links to other resources. To fully display a web page, all the linked and sub-linked resources generally need to be retrieved by a client. This incremental discovery may lead to a slow display of a web page, especially on high latency networks such as mobile networks.

Using the Push feature, the server device may push the linked and sub-linked resources to the client device before the latter discovers they are needed and requests them.

In order to push a resource to the client device, the server device must first send a PUSH_PROMISE frame which indicates which resource the server device intends to push. Once the PUSH_PROMISE frame for a resource has been sent, the server device creates a new stream in order to transmit said resource. One may note that the client device has the possibility of rejecting the pushed resource, typically by closing the server-initiated stream used to transmit said pushed resource. Note that the PUSH_PROMISE frames can only be sent on streams that have been initiated by clients.

For instance, when the client device requests resource example.html, the request is made through a client-initiated stream. Consequently, if the server device considers that pushing example.js, example.css and example.jpeg would be advantageous for the client device (typically because these resources are referred to in example.html and because the client device will obtain them faster if they are pushed than if it has to request them after parsing example.html), the server device will use the client-initiated stream to send one PUSH_PROMISE frame for each of those three resources.

It should be noted that the HTTP/2 specification recommends that the PUSH_PROMISE frames should be sent "prior to sending any frames that reference the promised responses". This is because, still referring to our example above, if example.html is sent prior to sending the PUSH_PROMISE frames, the client device may for instance parse example.html, and discover that example.js is needed to process example.html, and then send a request for obtaining example.js, which is not useful if example.js is going to be pushed.

The HTTP/2 Push feature can be used in the context of DASH (standing for Dynamic Adaptive Streaming over HTTP) which is a new standard that has recently emerged from the MPEG standardization committee ("ISO/IEC 23009-1, Dynamic adaptive streaming over HTTP (DASH), Part1: Media presentation description and segment formats").

Usually, DASH puts the client device in charge of requesting media data, i.e. resources, such as video. In some cases, having the media data provided to the client device using the push approach (i.e. without specific request for each media data) may allow better efficiency. In particular, it may reduce the latency for the client device to obtain a given video segment since the server device can push the video segment to the client device as soon as the video segment is available.

In the context of DASH and in more general context, an application, for instance a web application, may desire to estimate the current connection quality, in particular the available bandwidth and/or network latency over the network.

This information may be of great importance, for instance to select a media (audio, video, images, etc.) with a best and appropriate resolution.

Conventionally, a web application may evaluate the quality of a connection or of the network based on on-going exchanges.

For instance, a DASH client evaluates the available bandwidth based on previous video segments downloaded.

This approach does not require additional data to be transmitted, and thus does not affect the network layer.

However, the results may not always be accurate. For instance, other data may be transmitted in parallel that can modify the evaluation of the available bandwidth.

In the specific case of a web application, the situation may be worse for instance if some resources are already cached or partially cached (e.g. in a proxy local to the client device). This may happen when the server device is pushing data. The data are then partially cached when the web application requests them, thus making it possible for the web application to retrieve them very quickly. As a consequence, overoptimistic bandwidth estimation is obtained.

Another possibility to evaluate the network quality is to do active probing. For instance, the client device asks the server device to send a big chunk of data. Then, based on the sent data, the client device estimates the available bandwidth.

This approach removes the risk for actual caching and, the data being sufficiently large, the network metrics should be correctly evaluated (because the network capacity should be reached).

However, this approach wastes bandwidth resources and may also disrupt the user experience. For instance, regarding DASH, active probing may impact the transmission of video segments due to available bandwidth, thus resulting in pausing the video playback.

When the Push feature is intensively used by the server device, an estimation of the network quality is made difficult for the client device. This is mainly because it may not be aware of when the data is actually being sent. Indeed, on one hand, the server device decides when to send pushed data, while on the other hand, the client device may also make explicit GET requests which will be competing with the Push responses for the same bandwidth, thus leading to pessimistic bandwidth estimation.

In addition, since some data may already be cached, the estimation of the network quality is sometimes too optimistic.

The present invention has been devised to address at least one of the foregoing concerns.

SUMMARY OF THE INVENTION

In this context, according to embodiments of the invention, there is provided a method for a server device to provide resources to a client device, comprising at the server device:
receiving a message from the client device based on which the server device determines resources to push to the client device;
receiving a probing message from the client device requesting the server device to enter a probing mode;
wherein the probing mode includes the following steps for the server device:
pushing, to the client device, the determined resources, using a target data rate; and
notifying the client device of pushing information, for instance at least a start of pushing the determined resources, thereby enabling the client device to determine an actual data rate of transmission of the pushed resources.

The approach, from the server device's perspective, allows the client device to inform the server device that it wants to probe the bandwidth, similarly to active probing. The server device then starts pushing some data that are not explicitly requested by the client device, the server device preferably selecting data that it assumes to be useful later on to the client device. The client device thus receives the pushed data and may store them in its HTTP cache. In addition, the server device makes sure that the client device, in particular a client application, is informed when the data are actually sent. This is performed through notifications.

This results in this communicating method making it possible to avoid bandwidth waste thanks to the use of the push feature that avoids client requests for data, and also thanks to the useful data that are pushed for probing, which useful data will not be requested later on by the client device.

This method also enables efficient network quality estimation to be performed, in particular because of the notification that makes it possible for the client device to know precisely start and possibly end times of transmission of the probing pushed data.

Correspondingly, there is provided a server device in a communication network, comprising:
a communication module configured for receiving a message from a client device based on which the server device determines resources to push to the client device; and for receiving a probing message from the client device requesting the server device to enter a probing mode;
probing mode circuitry configured, when the server device is in the probing mode, for pushing, to the client device, the determined resources, using a target data rate; and for notifying the client device of pushing information, for instance at least a start of pushing the determined resources, thereby enabling the client device to determine an actual data rate of transmission of the pushed resources.

The server device has the same advantages as the method defined above.

Further embodiments of the invention are defined in the dependent appended claims and are explained below in terms of method features.

In some embodiments, the pushed determined resources correspond to data having a first quality of data (e.g. a given resolution or level of compression, thus defining an amount of data) and the target data rate defines a data rate for pushing data having a second and higher quality of data.

This approach can be seen as an emulation of the push of data at a higher bit rate (the target one). It is for the client device to test (at the server) whether or not a higher quality of data can be implemented to receive other pushed resources. Since the data having the first and lower quality are used for this emulation, the communication remains at the lower quality, ensuring all the pushed data to be usable by the client device. Indeed, regardless of the outcome of the emulation (is there any spare data rate to increase the quality?), the low quality data will be received in due time.

Of course, depending on such outcome, the client device (which estimates the actual data rate) may thus request an upgrade of the quality of the pushed resources.

In other embodiments, the probing message includes an indication of a quality of resources expected by the client device, and the actual data rate to be used is determined based on the expected quality indicated in the probing message.

Thanks to this provision, the client device forces the server device to emulate an expected transmission mode, i.e. with the expected quality. Whether the estimated or measured network quality is satisfactory or not will drive the client device to switch to the expected transmission mode or not.

In yet other embodiments, the probing message includes a stopping criterion for the server device to determine when to exit the probing mode, i.e. mainly to stop notifying the client device, while still pushing resources that may be of interest for the client device. The stopping criterion may be a probing duration and/or an amount of probing data to be pushed. This enables the client device to properly drive the probing procedure at the server device.

In yet other embodiments, the probing message includes a playback time or indicator of a multimedia file, and the resources to push correspond to data of the multimedia file starting from the playback time or indicator included in the probing message. This approach substantially reduces bandwidth waste since the pushed resources are highly likely to be useful for the client device.

In yet other embodiments, the probing message is a request for a media presentation description, MPD, file. This provision makes the server device start the push of resources early, resulting for instance in a fast start of the media defined by the MPD file. It is to be noted that a by-default quality of the media as defined in the MPD file may be used to select the resources to push. In a variant, the media quality that matches any indication of a quality in the probing message may be used.

In yet other embodiments, the probing message is a web socket message sent using an existing Web Socket connection established between the client device and the server device. The transmitted Web Socket message may include all probing parameters and be formatted as XML or JSON.

In yet other embodiments, the probing message is a request received from the client device to open a Web Socket connection with the server device. This connection is used afterwards to convey the notification or notifications between the server device and the client device. In other words, the step of notifying includes sending a web socket message in a web socket connection established as a result of the request to open a web socket connection.

In that case, the probing parameters may be defined as part of the Web Socket connection handshake, or may be default values. These parameters may be afterwards modified by either device, by sending a message formatted as XML or JSON through the Web Socket connection.

In yet other embodiments, notifying the client device of pushing information includes notifying the client device of a start of pushing the determined resources and of an end of pushing the determined resources, thereby enabling the client device to determine an actual data rate of transmission of the pushed resources.

In yet other embodiments, the server device notifies the client device by sending a web socket message through a web socket established between a client application in the client device and a server application in the server device. Using a web socket makes it possible to notify efficiently high level applications of the client device (such as web applications) that do not have access to HTTP/2 features (usually implemented at lower level, e.g. by the browser), therefore resulting in better estimation of the network quality.

In yet other embodiments, the server device pushes the determined resources immediately after notifying the client device of the pushing information. This is to obtain the best estimation of resource transmission time, and thus of network quality, since the notifications strictly define the transmission time.

In specific embodiments, the server device's notification of pushing information includes a PUSH_PROMISE message.

In yet other embodiments, the pushed determined resources are resources of a media defined in a media presentation description, MPD, file requested by the client device. Thus the pushed resources are likely to be useful data for the client device.

In yet other embodiments, the determined resources are pushed as a plurality of push messages. Such split of the determined resources into elementary chunks increases the likelihood of subparts of the pushed resources being individually reused by the client data, thereby reducing bandwidth waste.

In yet other embodiments, the server device assigns priorities to messages pushing the determined resources and to messages notifying the client device of the start and end of push. This is to force any intermediary device between the client and server devices, such as a proxy, to keep the order of the messages. Otherwise, the estimation of resource transmission time and thus of the network quality would be biased, for example if the notification of push end is forwarded to the client device before some pushed resources.

In specific embodiments, the notification of start of push is assigned a higher priority than the messages pushing the determined resources, themselves being assigned a higher priority than the notification of end of push. This configuration ensures the start notification is first to be received by the client device, followed by the push data, and then by the end notification. The resource transmission time can thus be estimated with more accuracy.

In yet other embodiments, the method further comprises, at the server device after having notified the client device of an end of push, receiving, from the client device, a request to provide new resources with a quality of resources higher than a quality of the pushed determined resources.

It is a positive action that the client device would generally take if it obtains a good estimate of the network quality according to the teachings of the invention. For instance, the higher quality of resources is the second and higher quality of data corresponding to the target data rate.

In yet other embodiments, the method further comprises, when the server device exits the probing mode, pushing new resources to the client device without notifying (through the web socket) the client device of a start and an end of the push of the new resources. This provision clearly shows that the network quality estimation procedure as defined above may be nested in a conventional push procedure, without substantial downside regarding bandwidth use since the resources that normally would be pushed are used for the network quality estimation procedure.

From the client device's perspective, there is provided a method of communicating with a server device, comprising at the client device:

sending a message to the server device enabling it to determine resources to push to the client device;

sending a probing message to the server device requesting it to enter a probing mode;

wherein while the server device is in the probing mode:

the client device receives, from the server device, pushed resources and at least one notification of pushing information, for instance a start of the push of the resources; and the client device determines an actual data rate of transmission of the pushed resources based on the notification.

Correspondingly, there is provided a client device comprising:

a communication module configured for sending a message to a server device enabling it to determine resources to push to the client device; and for sending a probing message to the server device requesting it to enter a probing mode;

the client device being configured for, while the server device is in the probing mode:

receiving, from the server device, pushed resources and at least one notification of a start of the push of the resources; and determining an actual data rate of transmission of the pushed resources based on the notification.

The method and client device provide the same advantages as defined above from the server's perspective.

For reasons of symmetry, what has been described above from the server's perspective applies to same features defined at the client side, for instance the reception of a notification of push end, the indications included in the probing message, the use of a web socket for notification, the use of a plurality of push messages, the sending of a request to change the quality of resources into a higher quality for future push of new resources. Also, the client device may receive new resources pushed by the server device after the latter exits the probing mode. No notification of start/end push for these new resources is thus received.

In addition and specific to the client side, the sending of a probing message may be in response to a user request for changing a quality of resources at the client device. For example, the user may want to upgrade the quality of a media currently played into a higher quality. According to this embodiment, the network quality estimation procedure according to the invention is thus triggered upon a user making such request to ensure that enough bandwidth is available before switching to the higher quality.

In embodiments, the actual data rate is calculated by the client device based on the time of reception of the start notification and an estimated time of end of push.

The estimated time of end of push may be a time of reception of a notification of end of push; or may be a time of end of receiving a frame closing the stream used for the push (for example if a client application accesses all HTTP/2 features); or even a time of end of receiving the pushed resources from a cache local to the client device.

In other embodiments, the method further comprises, at the client device, sending a request to the server device to upgrade a quality of new resources to be pushed to a higher quality than a quality of said pushed resources. Usually, such request is sent by the client device if the latter has determined a satisfactory network quality (i.e. a quality, such as network bandwidth, that allows transmission of data having such higher quality).

In specific embodiments, the higher quality is the highest quality below a quality corresponding to the determined actual data rate, from a plurality of qualities at which resources are available. Considering the example of DASH, the plurality of qualities may be defined in a media presentation description, MPD, file. Thus, the above provision defines determining the media representation in the MPD file having the highest quality that is below the determined actual data rate.

In yet other embodiments, a web application in the client device queries the pushed resources to a proxy. This is to force such proxy (generally local to the client device) to relay all the resources pushed by the server device. Otherwise, the proxy could discard some push resources as soon as they are already in cache. The above provision means that the estimate of the network quality is not biased by the existence of cached resources at a proxy.

According to other embodiments of the invention, there is provided a method for a server device to provide resources to a client application (for instance a web application) in a client device, the client application communicating with the server device using a client module (for instance a web browser) in the client device separate from the client application, comprising at the server device:

receiving a message from the client module based on which the server device determines resources to push to the client device;

receiving a probing message from the client application requesting the server device to enter a probing mode;

wherein the probing mode includes the following steps for the server device:

pushing, to the client module, the determined resources; and notifying the client application of the push of the determined resources to the client module, thereby causing the client application to request the pushed resources from the client module. The client application consequently retrieves the pushed resources from the client module.

Correspondingly, there is provided a server device in a communication network, comprising:

a communication module configured for receiving a message from a client module of a client device based on which the server device determines resources to push to the client device; and receiving a probing message from a client application in the client device separate from the client module, the probing message requesting the server device to enter a probing mode;

probing mode circuitry configured, when the server device is in the probing mode, for pushing, to the client module, the determined resources; and for notifying the client application of the push of the determined resources to the client module, thereby causing the client application to request the pushed resources from the client module.

Such approach from the server's perspective makes it possible to save processing time at the client side, in particular when the client application is not aware of the push features (for instance because web applications have no access to HTTP/2 library, contrary to the web browser in which the applications are executed). This is achieved by the specific notification defined above, that causes such a web application to directly request the pushed data from the web browser without wasting time.

It is to be noted that the options described above apply to the same features in these embodiments: for instance the indications included in the probing message.

In some embodiments, the server device notifies the client device by sending a web socket message through a web socket established between the client application and a server application in the server device. The web socket can advantageously be used in parallel to the HTTP/2 streams.

From the client's perspective, there is provided a method of communicating with a server device, comprising at the client device:

sending, by a client module in the client device, a message to the server device enabling it to determine resources to push to the client device;

sending, by a client application in the client device separate from the client module, a probing message to the server device requesting it to enter a probing mode;

wherein while the server device is in the probing mode:

the client module receives, from the server device, pushed resources;

the client application receives, from the server device, notifications of the push of the resources to the client module, thereby causing the client application to request the pushed resources from the client module.

Correspondingly, there is provided a client device comprising:

a client module configured for sending a message to the server device enabling it to determine resources to push to the client device; and for receiving, from the server device, pushed resources a client application separate from the client module and configured for sending a probing message to the server device requesting it to enter a probing mode; and for receiving, from the server device while the latter is in the probing mode, notifications of the push of the resources to the client module, thereby causing the client application to request the pushed resources from the client module.

Again, the options described above at the client side apply for the same features in these embodiments: for instance the request for changing the quality of resources.

In some embodiments, the client application queries the pushed resources to the client module, thereby causing the client module to request the pushed resources from a proxy.

The invention is also directed to a non-transitory computer-readable medium storing a program which, when executed by a microprocessor or computer system in a device of a communication network, causes the device to perform the steps of any of the methods as defined above.

The non-transitory computer-readable medium may have features and advantages that are analogous to those set out above and below in relation to the method and server device, in particular that of improving control of the client device over the server device in processing requests from the client device.

Another aspect of the invention relates to a method substantially as herein described with reference to, and as shown in, FIG. 3; FIG. 4 of the accompanying drawings.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

Figure 1:
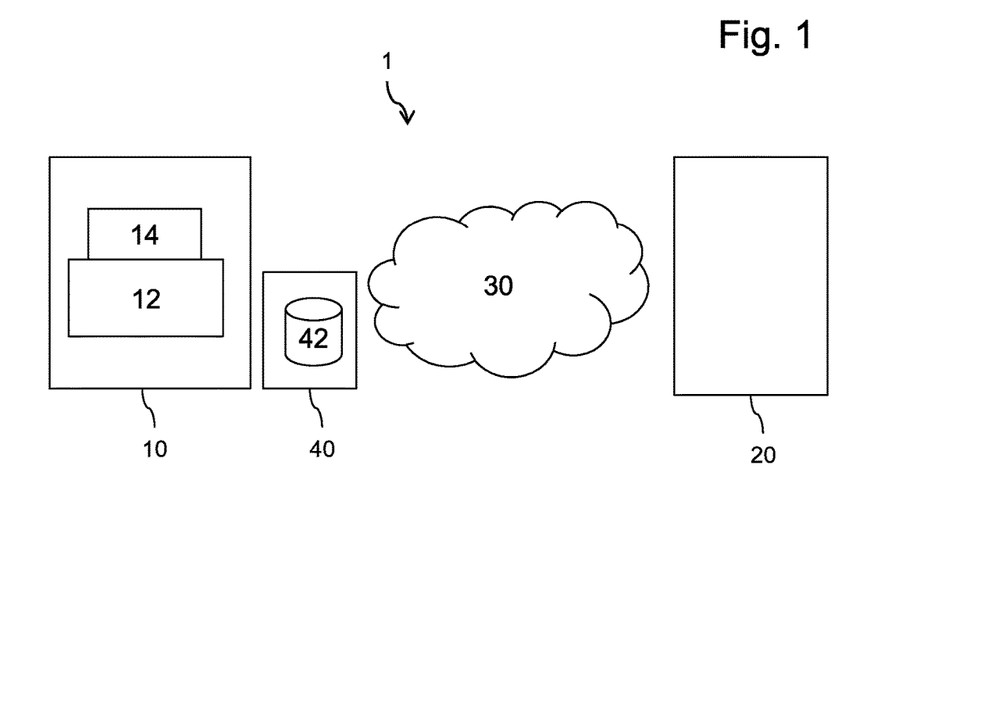
FIG. 1 illustrates an exemplary communication system in which embodiments of the invention may be implemented.

FIG. 1 illustrates an exemplary communication system 1 in which embodiments of the invention may be implemented. Only one client device and one server device have been represented in this system for ease of explanation. Of course, a plurality of such devices may be considered that each implements teachings of the invention as described in the present document.

Schematically represented, client device 10 includes web browser 12 and web application 14. Web browser 12 is in charge of HTTP exchanges with server device 20, in particular based on HTTP/2 protocol.

As described above, HTTP/2 provides new features, in particular streams, priority and push. An HTTP/2 client library may provide an API allowing access to all these features (e.g. create a new stream, set a priority, or be informed that a resource has been pushed). To implement all the features of HTTP/2, web browser 12 has access to such HTTP/2 library as well known in the art.

However, an application may not have access to these features. In particular, in the case of a conventional web application running in web browser 12, the web application does not have direct access to the HTTP/2 library used by web browser 12.

Instead, web browser 12 defines specific APIs enabling web applications to use libraries. An example of such an API is the XmlHttpRequest API, which is implemented by the main web browsers. This API has been designed with HTTP/1.X, hence it does not provide access to the new HTTP/2 features.

Another API could be developed and provided by web browser 12 so that web application 14 has access to all HTTP/2 features.

Usually, even if a web application is executed in a web browser using an HTTP/2 library, the web application is not aware of specific HTTP/2 context, such as priorities or pushed data.

Features of the present invention according to embodiments make it possible to overcome this limitation to provide efficient communication methods and network quality estimation as defined above.

Client device 10 and server device 20 are interconnected through a data communication network 30, for instance Internet network, 3G or 4G mobile network.

In a number of situations, one or more intermediary devices or entities exist in the path between client device 10 and server device 20. As schematically depicted in the Figure, a proxy may be provided. For instance, proxy 40 is a client proxy local to client device 10, and includes a client proxy cache 42 conventionally used to cache data received from server device 20.

The server device may provide a variety of resources or data, from media data such as video games, video, audio and image files, to web data (for instance live weather forecasts or live market exchange information). In the description below, focus is mainly made on media data, but the same teachings apply to other data that may be requested from and/or pushed by a server device.

Thus, server device 20 may be a video server able to provide video streams based on DASH.

DASH allows the streaming of media content (generally audio/video content) over HTTP. DASH defines how to describe a media presentation as a manifest file in XML format, called media presentation description file or MPD in the remainder of the present document.

When delivered to a client device, this file provides sufficient information for the client device to request and control the delivery of media contents.

More particularly the MPD describes all media content components that can be accessed for a given media presentation. Such a description may comprise the types of the media content components (for example audio, video, audio-video, or text), the durations of the media segments, and the addresses (e.g. the URL) or means (e.g. templates) to compute the addresses associated with the media segments, that is to say the addresses from which segments that compose the media content components can be obtained.

The MPD is based on a hierarchical data model. It consists of one or multiple periods, each period having a starting time and a duration and consists of one or multiple adaptation sets. An adaptation set provides the information about one or more media content components and its various encoded alternatives, each encoded alternative of the same media content component being referred to as a representation and having its own quality. In turn, each representation typically consists of one or multiple media segments.

A typical use case scenario for implementation of the invention is a DASH video player that desires to switch to a higher quality version of a video if enough bandwidth is available.

As discussed above, a similar scenario may take place in other contexts, such as in the case of a distributed game web application for which more information (instead of a higher quality) on other players (position, textures, etc.) is sent if enough bandwidth is available. It is also the case for a news website, the content of which changes very quickly. The increase in quality if enough bandwidth is available may allow switching from news website notifications consisting of text-only to notifications made of text with audio or made of text with images and videos.

Back to the typical use case scenario based on a web application, an implementation of the invention may include the following:

- The web application opens an HTTP/2 or SPDY connection with the server device, for example by requesting an MPD file;
- The web application opens a Web Socket connection with the server device;
- During execution of the web application, the latter wishes to check what execution mode should be best appropriate, for instance because time has elapsed since the last check. The execution modes define different qualities of the media defined in the MPD file;
- The web application makes a probing request (through the HTTP/2 or SPDY connection) to the server device to enter a probing mode during which an estimation of the network bandwidth is carried out. The request may include the purpose of the probing mode, in particular the expected execution mode to enter (for instance the DASH video expected quality);
- The server device receives the request, thereby entering the probing mode. By entering this mode, the server device starts pushing data, such as video segments corresponding to the requested MPD file with the expected video quality as specified in the probing request.
- For each response (e.g. HTTP/2 frame) that is pushed, the server sends (just before starting pushing of the data) a notification to the web application using the web socket, which notification identifies the data to be pushed and states the time of push start.
- The server device optionally sends a web socket notification when finishing the transmission of each pushed response;
- The web application computes the elapsed time between the start and end of each response transmission, based on the time at which it received the two web socket notifications. The bandwidth can be estimated as the size of the pushed data divided by the elapsed time. The size may be specified in a PUSH_PROMISE (for HTTP/2) or SYN_STREAM (for SPDY) message informing of the forth-coming pushed data. In a variant, the size may be specified in a header of the pushed data, in case the web application is able to directly retrieve the pushed data from HTTP/2 layer.
- To be noted that in case of interleaved responses, the web application may need to consolidate the results by considering the interleaved responses as one big response, i.e. using the first push start notification for the interleaved responses and the last push end notification for the same interleaved responses;
- In a slight variant, instead of relying on the push end notification, the web application (which is aware of data being pushed thanks to the push start notification) may explicitly query each of the pushed data to the web browser (to retrieve the pushed data from the local HTTP buffer).
- This allows finer-grained estimation to be obtained as the web application will get notification of each response transmission progress, leading to earlier bandwidth estimation.
- This also ensures that, should there be a proxy between the web application and the server device, the data pushed by the server device are relayed by the proxy.

Once the bandwidth has been evaluated, the web application may decide to stop the active probing mode by requesting the server device to do so. The server may also decide to stop it on its own, once sufficient data have been transmitted or once a predefined probing duration has elapsed. End of active probing mode means that the server device no longer notifies the start and end transmission time when pushing data. It only sends the conventional PUSH_PROMISE (or SYN_STREAM) messages or the like;

Based on the bandwidth evaluation, the web application may thus decide to switch to a new execution mode, for instance based on a higher quality of the video segments.

Note that the transition for the switching may be eased by the probing mode activation as defined above, since some video segments needed to perform the transition may have been selected to be pushed and thus have already been transmitted to the client device during the probing mode. They are thus already available in the client HTTP cache to the web application.

In the case of a native web application that has access to all HTTP/2 client information (i.e. all HTTP/2 features of the HTTP/2 client library, possibly through appropriate APIs of the web browser), the web socket connection may not be needed. This is because the web application is able to directly detect a PUSH_PROMISE frame: thus, the server device being in probing mode, it may start the transmission of pushed data immediately after the PUSH_PROMISE frame is sent. The PUSH_PROMISE frame therefore acts as a push start notification. The end of the transmission can also be detected by the native web application, for instance by directly requesting the pushed data from the HTTP client cache.

This use case scenario clearly shows that accurate network metrics estimation can be conducted without wasting bandwidth and resources.

This is because the bandwidth estimation is based on data pushed by the server device (i.e. without specific requests from the client web application). This is also because the pushed data are not padding data but useful data for the client web application, e.g. video segments in the present example.

Also, specific embodiments may involve splitting the data to be pushed during the probing mode into a plurality of pushed HTTP/2 responses. As a result, the data are stored in the client HTTP cache as a plurality of elementary data. It increases the probability that each elementary data is reused later on by the web application, thus reducing potential user interaction disruption and bandwidth resource wasting.

The use case scenario also shows that the deficiencies of web applications in failing to know when the data are pushed can be easily overcome by using an additional communication link, e.g. a Web Socket.

It has also been seen in this scenario that the proxy can be forced to relay the pushed data to the web application. Indeed, proxies may actually filter out pushed data for example because they already have the data in cache. To make sure the data are actually received, the web application may actually request it explicitly. In such a case, either the client device will have received the corresponding PUSH_PROMISE and will wait for the proxy to push the corresponding data or the client device will make the request to the proxy that will send the data.

By doing so, and checking a bandwidth estimate based on each video segment, the web application may validate or invalidate the bandwidth estimate related to a particular segment. If the bandwidth for one segment is invalidated, the bandwidth for the next segment will probably not be invalidated.

Another problem that may arise from the presence of proxies is that the proxies may reorder the frames (thus pushed data) received from the server device at their convenience. This may have an impact on the arrival time of Web Socket notifications, leading to skewed bandwidth estimation. This may also have an impact in case the pushed data is transmitted sequentially.

To overcome this situation, the server device may force any proxy to handle the web socket notifications and the pushed data in the correct order. This may be achieved by assigning priorities to messages pushing the determined resources and to messages notifying the client device of the start and end of the push. In particular, to keep the appropriate order of the messages, the notification of start of push is assigned a higher priority than the messages pushing the determined resources, themselves being assigned a higher priority than the notification of end of push, if any.

HTTP priorities are a well-known feature. In HTTP/2, one TCP connection is used for multiple message exchanges. Each message exchange is performed on an HTTP stream within the TCP connection. For an optimal usage, a client device may need data conveyed in some streams before those conveyed in other streams.

To allow the client device to express how it would prefer the server device to handle the different streams, HTTP/2 provides a so-called priority mechanism. By setting priorities to each stream, the client device is able to build a weighted tree organizing all the streams. The server device thus should start processing the streams at the root of the tree (i.e. with high priority), sharing its resources between the branches according to the weights of the branches.

Figure 2:
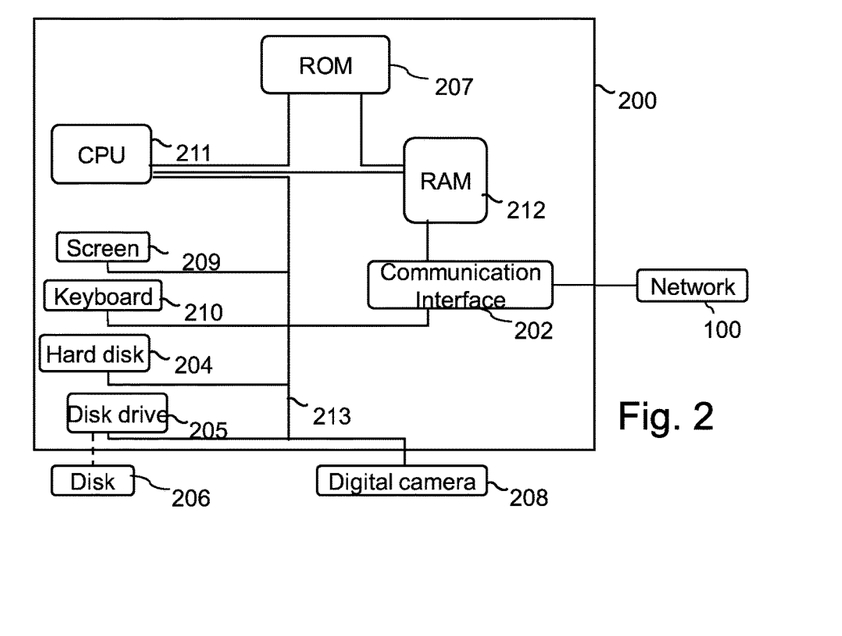
FIG. 2 is a block diagram illustrating components of a communication device in which embodiments of the invention may be implemented.

FIG. 2 schematically illustrates a communication device 200, either a client device or a server device or a proxy as depicted in FIG. 1.

This communication device 200 is configured to implement at least one embodiment of the present invention. The communication device 200 may be a device such as a micro-computer, a workstation or a light portable device. The communication device 200 comprises a communication bus 213 to which there are preferably connected:

- a central processing unit 211, such as a microprocessor, denoted CPU;
- a read only memory 207, denoted ROM, for storing computer programs for implementing the invention. In particular, ROM 207 may store the various predefined processing profiles (and thus the characteristics of the corresponding predefined amount of resources) and associated specific priority parameter values;
- a random access memory 212, denoted RAM, for storing the executable code of methods according to embodiments of the invention as well as the registers adapted to record variables and parameters necessary for implementing methods according to embodiments of the invention; and
- at least one communication interface 202 connected to the radio communication network 100 over which HTTP/2 frames can be exchanged with other communication devices. The frames are written from a FIFO sending memory in RAM 212 to the network interface for transmission or are read from the network interface for reception and writing into a FIFO receiving memory in RAM 212 under the control of a software application running in the CPU 211.

Optionally, the communication device 200 may also include the following components:
- a data storage means 204 such as a hard disk, for storing computer programs for implementing methods according to one or more embodiments of the invention;
- a disk drive 205 for a disk 206, the disk drive being adapted to read data from the disk 206 or to write data onto said disk;
- a screen 209 for displaying decoded data and/or serving as a graphical interface with the user, by means of a keyboard 210 or any other pointing means.

The communication device 200 can be connected to various peripherals, such as for example a digital camera 208, each being connected to an input/output card (not shown) so as to supply data to the communication device 200.

The communication bus provides communication and interoperability between the various elements included in the communication device 200 or connected to it. The representation of the bus is not limiting and in particular the central processing unit is operable to communicate instructions to any element of the communication device 200 directly or by means of another element of the communication device 200.

The disk 206 can be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may be stored either in read only memory 207, on the hard disk 204 or on a removable digital medium such as for example a disk 206 as described previously. According to a variant, the executable code of the programs can be received by means of the communication network 203, via the interface 202, in order to be stored in one of the storage means of the communication device 200, such as the hard disk 204, before being executed.

The central processing unit 211 is adapted to control and direct the execution of the instructions or portions of software code of the program or programs according to the invention, which instructions are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 3:
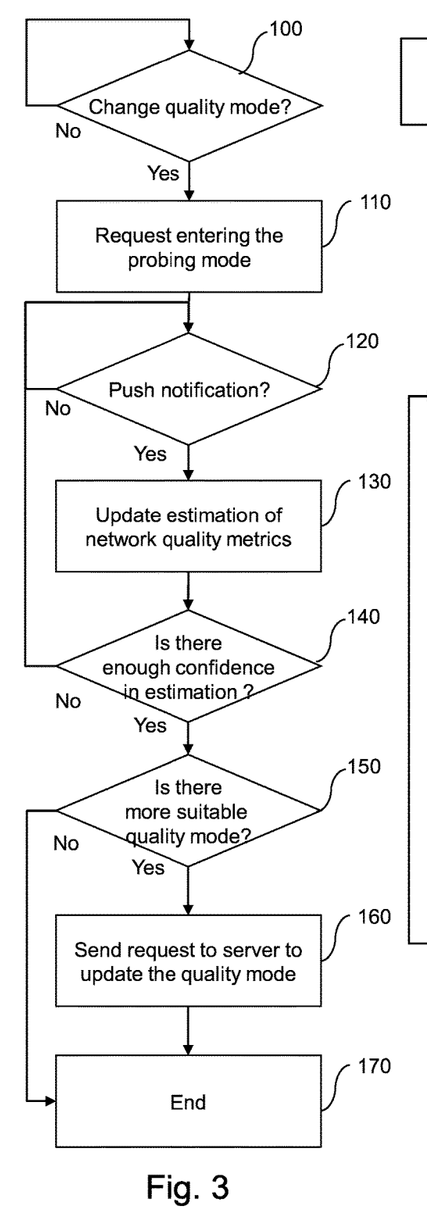
FIG. 3 is a flowchart illustrating general steps of embodiments of the invention at the client device of FIG. 1.
Figure 4:
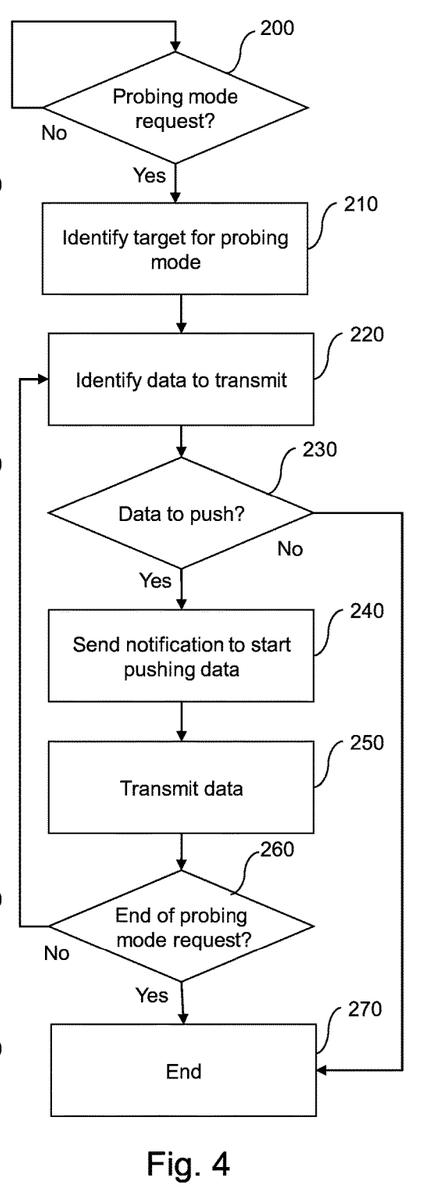
FIG. 4 is a corresponding flowchart illustrating general steps of embodiments of the invention at the server device of FIG. 1.

FIG. 3 is a flowchart illustrating general steps of embodiments of the invention at client device 10.

The process starts when web application 14 receives a request to check for execution mode change (test 100). Beforehand, web application 14 may already have loaded a web page or an MPD file from server device 20, and be currently receiving corresponding data from that server device 20, based on the push feature.

For instance, the request may be a user request for changing a quality of resources at the client device. In the case of video, this may typically be a request to check for a higher video quality.

The user request may result from a user clicking on a button on a displayed user interface.

In a variant the request may be automated by the application: for instance web application 14 or any other entity in the client device 10 may detect that its video buffer is full, in which case it may desire to check for a higher resolution, or on the contrary that its video buffer is often empty, in which case it may desire a lower quality to be adopted because it would be more adapted to bandwidth capacities.

In response to this request detected at step 100, web application 14 requests server device 20 to enter a probing mode. This is step 110.

This may be done by sending a network message or "probing request" (HTTP request typically, but it may also be a Web Socket message if a web socket connection is already established with the server device, etc.).

This probing request may include parameters driving the probing mode at the server side.

For instance, it may include a stopping criterion for the server device to determine when to exit the probing mode, for instance a time or a maximum data size.

It may also include information on which execution mode web application 14 is expecting to switch to, e.g. an indication of a quality of resources expected by web application 14.

Among other possibilities is that the probing request includes a playback time or indicator of a multimedia file, for instance the current time of a video being displayed at the client. This is to drive the server device to search for useful data to be pushed for the network quality estimation.

In a specific embodiment, the probing request is a request to open web socket connection with server device 20.

Once the probing mode request has been sent, web application 14 may optionally receive a response from server device 20 stating that it is entering the probing mode.

Server device 20 thus transmits HTTP resources using HTTP/2 or SPDY Push mechanism, through the client-initiated HTTP stream used to send the probing request or used to request the MPD file or the like.

This mechanism consists in first sending a frame identifying the resource that is pushed. This is conventionally done using a PUSH_PROMISE frame in HTTP/2 or a SYN_STREAM frame in SPDY in the existing client-initiated stream.

However, web application 14 running in web browser 12 has no access to such information, contrary to the web browser.

As a consequence, embodiments of the invention provide that server device 20 also notifies web application 10 that it is pushing data, in particular that it starts pushing and optionally that it ends pushing data (as described below with reference to FIG. 4). The notification is performed by sending a Web Socket message that web application 14 will receive, the web socket message containing similar information to the PUSH_PROMISE frame: typically the URL of the data being pushed. It may also include additional information such as the expected data size and a timestamp in the server clock system.

In the specific embodiment in which the probing request above is a request to open web socket connection with server device 20, the web socket message can be received through the web socket connection resulting from this request.

It can be noted that WebSocket is a protocol providing a bidirectional channel between a client and a server on a TCP connection. This protocol is generally accessible to web applications executed in a web browser. In the context of HTTP/2, studies have proposed to embed a WebSocket channel into an HTTP/2 connection. In particular, a mapping could be defined so that a WebSocket channel corresponds to an HTTP/2 stream.

The server device 20 then immediately (after the notification is sent) starts the push of the resource data. Such an immediate start is not mandated in the IETF recommendation but it improves the accuracy of bandwidth estimation by client device 10.

The resource data selection is application dependent but should strive to optimize the probability of use of the resources by the client. In the case of an audio streaming web site, the resource data to push may be the next songs in the current playlist of the user or advertisements to be played at some point. These streams would have been transmitted later on anyway.

In the case of a video service like YouTube, the resources to push may consist in the next five segments to be asked by the user. This information may be known by a stateful server or may be transmitted to a stateless server within the probing mode request. In addition to the next five segments, the server may also select the following segments at a better resolution, in the hope the user will switch to this resolution. These resources may also be complemented with video advertisements. As these web sites also offer suggestions for other videos to play, initial low resolution segments of suggested videos may be transmitted in advance.

In the specific case of DASH or HLS, the probing mode request may be used to check whether switching to a better quality version of the video being played may be feasible or not. In that context, the resource data selection may consist in selecting low resolution segments (the current resolution) and sending them at the expected pace of high resolution segments (the target resolution). Emulation of high resolution video streaming is done based on low resolution video segments. Since it is expected for the client to switch to the target resolution, the selected data may also contain some high resolution video segments. Typically, enough low resolution video segments are sent first to ensure that the video streaming continues without pausing. Then high resolution video segments are sent as if the client has switched to high resolution at that time.

For a conventional web site with web pages that contain rich content (text, images, videos), the rich content may only be displayed if there is sufficient bandwidth available. In that case, the server may push the images and videos linked from the web page (as well as some other connected web pages such as related articles).

Back to FIG. 3, client device 10, in particular web application 14, thus waits for web socket notifications from client device 20 (step 120).

Upon receiving push start notification and push end notification from server device 20, web application 14 starts estimating network quality metrics.

For that purpose, web application 14 when receiving a push start notification stores the time of reception of that notification as Ts, and when receiving a push end notification for the same pushed data stores the time of reception of that notification as Te, If the client device is a native application that has full access to the HTTP/2 client information, the time Te may be computed when receiving a frame that closes the server-initiated stream used to transmit the pushed data, instead of relying on a push end notification.

If the client device does not have full access to the HTTP/2 client information, like in the case of a web application, it may compute Te using one or the other of the two following approaches.

First, the web application may explicitly request the pushed data from the HTTP client cache (through the web browser). Since the pushed data is stored in HTTP client cache, this explicit request will not cause a new network exchange. The client application may thus compute Te as the time for which the response to the request (i.e. the pushed data) is fully transmitted from the HTTP client cache.

A variant already explained above relies on a push end notification sent by server device 20 in the web socket established with web application 14 when completing the push of the corresponding resource. The notification may possibly include the URL of the data which have been pushed and a timestamp corresponding to the end of transmission on the server. Te is the time at which the notification is received.

At step 130, web application 14 can thus estimate the transmission time of the pushed data as Te-Ts. To compute the available bandwidth, web application 14 simply needs to divide the size of the pushed data by the estimated transmission time.

In parallel, based on the timestamps included in the push start and push end notifications, web application 14 can also estimate the available bandwidth at the server-side, i.e. the data rate at which the data have been pushed by server device 20.

Usually, the client-side bandwidth cannot be greater than the server-side bandwidth. Exception exists in the case of a proxy that caches data and pushes them faster than the server device does.

The client-side bandwidth may be equal to the server-side bandwidth if the client device has a very good network connection. This is particularly advantageous when the server device controls the data sent using a persistent PUSH strategy (i.e. when the client has allowed the server device to push any data at any time, for instance so that the video segments of a live broadcast are transmitted with minimum latency). Indeed, in such a situation, the server device can compute the available bandwidth without frequent client feedback.

However, usually for mobile devices, the client-side bandwidth is substantially smaller than the server-side bandwidth. This is because the radio link of the mobile device is usually the link with the smallest bandwidth.

During step 130, web application 14 can evaluate the available bandwidth for each pushed resource. If several resources are sent sequentially, filtering each individual bandwidth estimate may be used to compute a consolidated estimate.

Note that filtering may consist in evenly averaging the estimated results, or averaging them with a weight based on their respective transmitted data size. Robust estimators, such as M-estimators or Huber loss function may be used to remove the effect of outliers.

Once network metrics have been estimated or updated, web application 14 waits for reception of additional pushed data in order to consolidate the results. This is step 140 where a criterion to decide whether the current results are sufficient is used. In the case of a TCP connection, the bandwidth at the beginning of the connection will be small and will progressively increase until the connection is hot and the maximum available bandwidth is reached. In that case, the application will see initial bandwidth estimates that progressively increase until the estimates stabilize (i.e. remain within the same range with small negative and positive variations). The criterion may be in that case to determine when a few bandwidth estimates (e.g. four) oscillate around an average value, given a predefined margin.

If the estimates are satisfactory, web application 14 determines whether a more adapted execution mode can be selected, based on the network metrics as obtained. This is step 150.

In the case of DASH, this may consist in selecting a video stream described in the MPD whose bandwidth requirements are just below the estimated bandwidth or which has the next bandwidth requirement (i.e. quality) compared to the currently used quality.

In the case of a general web application, this process is application-dependent, for example to increase the amount of information received. For instance, general web application 14 may request and retrieve a web page that includes multi-type contents (text, image, video). Depending on the estimated bandwidth, all or part of the multi-type contents could be pushed (e.g. it is useless to push a video if not enough bandwidth is available).

In the case of a multiplayer game, the estimated bandwidth may be used to select the numbers of players whose synchronization data are sent to the application of the multiple users. It may be used to select the real-time audio quality.

In the case of a news web site, below a given bandwidth, a user may be presented a mobile version of the same web site, or a version with more or less advertisement or interactive content.

If web application 14 decides to switch to another execution mode, a request to do so is sent to the server device at step 160, which ends the process of the Figure. Otherwise, the process directly ends.

Thanks to the push start notification, web application 14 is aware of the data that are about to be pushed. In some cases, web application 14 can already have such data on its side. In such situation, web application 14 may notify the server device that it should stop and then cancel transmitting that data. This may be done by sending an RST frame for the corresponding stream. Upon receiving the RST frame, the server device may then communicate with web application 14 to invalidate the use of the cancelled data in the bandwidth estimation procedure.

FIG. 4 is a corresponding flowchart illustrating general steps of embodiments of the invention at server device 20.

At step 200, the server device waits for a probing request from a client device. As mentioned above, in this state, the server device may have previously established a web socket connection with web application 14 and have already provided a requested MPD file and thus already pushed some video segments described in this file. In a slight variant, the web socket connection may be established in response to the probing request (either initiated by the client device when it prepared the probing request at step 110 or initiated by the server device upon receiving the probing request).

In embodiments, the probing mode is triggered upon receiving a specific probing request from web application 14. Other embodiments may automatically trigger such mode upon receiving other requests, for example a request for an MPD file.

In particular, in the case of DASH video streaming start, it may be advantageous to push the first video segments upon receiving an MPD request so that video playback can start soon (such approach can be referred to as fast start). Doing at the same time probing mode and fast start video push will enable both starting video playback very soon as well as making the TCP/IP connection hot, leading to switching to the optimal video representation faster and in a single step.

Once the probing request has been identified, the server device enters the probing mode which triggers step 210 consisting for the server device to determine a target data rate of the probing mode.

As mentioned above, the probing request may include parameters identifying a client target: web application 14 may specify a specific quality for DASH video streaming. A web radio may specify a specific quality of audio streaming. An online game may specify a specific quality of image textures, or an expected number of other players.

Defining the target of the probing mode will help make the probing mode as efficient as possible as well as limiting the risk of wasting bandwidth.

Note that without specific information on a target data rate, the server device may device to use an "infinite" data rate, i.e. corresponding to transmitting data as fast as possible (by systematically filling the TCP buffer for the latter to be continuously full).

Based on the probing mode target, the server device identified data to transmit as pushed data. This is step 220.

The server may for instance identify the amount of data to transmit. For accurate bandwidth estimation, a minimum amount of data may be transmitted so that the network link (in particular the TCP/IP connection) reaches its maximum capacity.

For the same reason, the data transmission should last for a sufficiently large period of time. For instance, in the case of a DASH probing mode, the server device may try to emulate the streaming of a given video quality for a meaningful amount of time, typically for a period of time equivalent to several times the minimum buffered video time. Once the data to transmit has been identified, the server may schedule the sending of the data to reach the expected target data rate.

In the case of DASH video streaming, the server device may already be sending data corresponding to a given rate D. If the target specifies a higher rate D2, the server device may only push resources for a rate equal to D2-D, sending notifications for pushed data as well as usual transmitted data.

Once a total amount of data to push has been identified, the server device actually identifies which resources to push.

In the case of a probing target for video streaming at a given quality, the server device may select video segments of the desired resolution as described in an MPD file.

As noted above, if the probing request includes playback time information, the server device selects video segments located after the specified playback time.

For a general web application, the resources to push may consist of secondary resources such as advertisements, latest news entries that have probably not yet been read by the client, suggestions of new videos to see. Examples of data to be pushed have been given above with reference to FIG. 3.

Also as noted above, the resources to push can be split into several HTTP responses, leading to a sufficiently large amount of data to transmit as well as a high probability of client reuse of the data of each elementary response.

The actual identification of resources to push can be done once for the probing mode. Or in a variant, it may be done iteratively as the probing mode is running.

Once resources to push have been identified, the server device iterates through the selected data resources to push (using test 230).

The selected data may be sequentially considered, in particular if the network throughput is lower than the processing throughput (parallel transmission may increase the processing throughput) which is usually the case.

The server device may use the target data rate in two ways. First, it may progressively push the data at the target data rate. Otherwise, it may schedule the transmission of each resource to push at an appropriate time point given its size and the target data rate, and then may proceed with the transmission at the maximum data rate. The scheduling may be handled by the TCP layer.

The server device starts by sending a push data notification (step 240) which may consist of a PUSH_PROMISE frame targeted at the HTTP client as well as a Web Socket message targeted at the web application, as described above.

As the web application in the client device uses such web socket notification as the transmission start time, the server device immediately starts pushing the currently selected data at the target data rate (step 250).

At the end of the push of the currently selected data, the server may optionally send a Web Socket message to the web application to notify that the data transmission has ended.

To obtain accurate estimation of bandwidth at the client device, the push start and end notifications should delimit the pushed data as close as possible.

If the client device and the server device are directly connected, this is enforced by the underlying protocol for HTTP frames. In the case of Web Socket notifications that are sent in a different TCP/IP connection, there is no guarantee that the order of the messages as transmitted by the server device will be respected. However, except in case of packet loss, this should not alter the bandwidth estimation as long as the server device monitors its buffer queues (one for each TCP connection), since it can fill the TCP buffers so that they have the same filling level and thus they emit at roughly the same time.

If the Web Socket connection is established within the current HTTP connection, the order is guaranteed.

However, this situation is different if an intermediary entity, such as a proxy, lies between the client and server devices. This is because there is no guarantee of how the proxy will handle the messages received from the server device.

In particular, a proxy may process web socket messages more quickly compared to HTTP messages (the pushed data). In such a case, the server device should specify priorities as already mentioned above, so that the web socket message containing the start push information has a greater priority than the data push stream which should have a greater priority than the push end notification. Based on such priorities, the proxy should be expected to follow the order given by the server device.

Figure 5:
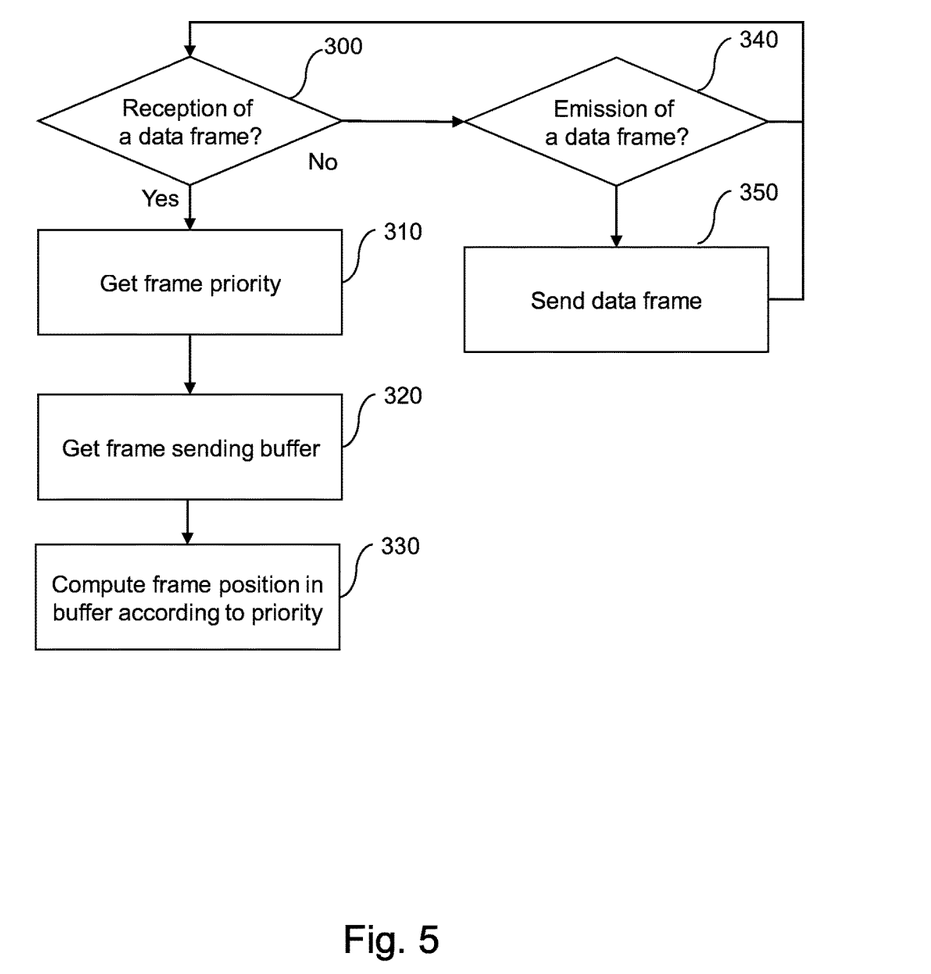
FIG. 5 is a flowchart illustrating general steps performed by the proxy of FIG. 1.

When all the data to push have been transmitted, the server device decides whether to stop the probing mode or not (step 260). If the probing mode should continue, the process loops back to step 220. Otherwise, the process ends at step 270. FIG. 5 is a flowchart illustrating general steps performed by the proxy of FIG. 1. The proxy is able to handle HTTP priorities as described above to keep the order of the messages and pushed data as transmitted by the server device, although they are transmitted in a stream and a web socket connection that are separate.

When receiving an HTTP frame from the client or server device (step 300), the proxy identifies (step 310) the frame priority, typically the priority associated with the corresponding stream.

Next, the proxy retrieves the buffer of frames to be sent (step 320).

If the buffer is empty, the current frame can be sent directly, regardless of its associated priority.

Otherwise, the proxy computes (step 330) the position in which the current frame has to be inserted in the frame buffer. The position is determined in the order of priorities.

When it is possible to send a frame (test 340 when no data frame is being received), the proxy picks the first data frame (i.e. with the highest priority) from the frame buffer and sends it through the network (step 350).

In the network quality estimation, the approach of the invention proposed above tends to maximize accuracy of the estimate because HTTP cache effects are handled in an appropriate manner. In addition, if needed, data pushes concurrent to the probing pushes may be paused or concurrent downloads may be slowed down up to a limit, in order to avoid skewed measures.

In addition, the approach tends to reduce and even minimize bandwidth wasting because the server device intends to select and push data that are highly relevant for the client device. The relevancy is further increased by splitting the data to push into various elementary resources to maximize the chance of them being reused by the client device.

Lastly, the approach tends to minimize user experience deterioration by, e.g. taking action at the server device to continue DASH streaming anyway.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method for a server device to provide resources to a client device, comprising at the server device:
   receiving an HTTP message from the client device based on which the server device determines resources to push to the client device using an HTTP protocol connection;
   receiving a probing message from the client device requesting the server device to enter a probing mode;
   wherein the probing mode includes the following steps for the server device:
   pushing, to the client device, the determined resources, using the HTTP protocol connection and a target data rate; and
   notifying the client device of pushing information using a Web Socket connection established between a client application in the client device and a server application in the server device, thereby enabling a web application running in a web browser of the client device to determine an actual data rate of transmission of the pushed resources, the Web Socket connection being separate from the HTTP connection.

2. The method of claim 1, wherein the pushed determined resources correspond to data having a first quality of data and the target data rate defines a data rate for pushing data having a second and higher quality of data.

3. The method of claim 1, wherein the probing message includes an indication of a quality of resources expected by the client device, and the actual data rate to be used is determined based on the expected quality indicated in the probing message.

4. The method of claim 1, wherein the probing message includes a stopping criterion for the server device to determine when to exit the probing mode.

5. The method of claim 1, wherein the probing message includes a playback time or indicator of a multimedia file, and the resources to push correspond to data of the multimedia file starting from the playback time or indicator included in the probing message.

6. The method of claim 1, wherein the probing message is a request for a media presentation description, MPD, file.

7. The method of claim 1, wherein the probing message is a Web Socket message sent using an existing Web Socket connection established between the client device and the server device.

8. The method of claim 1, wherein the probing message is a request received from the client device to open a Web Socket connection with the server device.

9. The method of claim 8, wherein the step of notifying includes sending a Web Socket message in the Web Socket connection established as a result of the request to open a Web Socket connection.

10. The method of claim 1, wherein notifying the client device of pushing information includes notifying the client device of a start of pushing the determined resources and of an end of pushing the determined resources, thereby enabling the client device to determine an actual data rate of transmission of the pushed resources.

11. The method of claim 1, wherein the server device pushes the determined resources immediately after notifying the client device of the pushing information.

12. The method of claim 11, wherein the server device's notification of the pushing information includes a PUSH_PROMISE message.

13. The method of claim 1, wherein the pushed determined resources are resources of a media defined in a media presentation description, MPD, file requested by the client device.

14. The method of claim 1, wherein the determined resources are pushed as a plurality of push messages.

15. The method of claim 10, wherein the server device assigns priorities to messages pushing the determined resources and to messages notifying the client device of the start and end of the push.

16. The method of claim 15, wherein the notification of start of push is assigned a higher priority than the messages pushing the determined resources, themselves being assigned a higher priority than the notification of end of push.

17. The method of claim 1, further comprising, at the server device after having notified the client device of an end of push, receiving, from the client device, a request to provide new resources with a quality of resources higher than a quality of the pushed determined resources.

18. The method of claim 2, wherein the higher quality of resources is the second and higher quality of data corresponding to the target data rate.

19. The method of claim 1, further comprising, when the server device exits the probing mode, pushing new resources to the client device without notifying the client device of a start and an end of the push of the new resources.

20. A method of communicating with a server device, comprising at a web application running in a web browser of a client device:
sending an HTTP message to the server device enabling the server device to determine resources to push to the client device using an HTTP protocol connection;
sending a probing message to the server device requesting it to enter a probing mode;
wherein while the server device is in the probing mode:
the web application at the client device receives, from the server device, pushed resources using the HTTP protocol connection and at least one notification of pushing information using a Web Socket connection established between a client application in the client device and a server application in the server device, the Web Socket connection being separate from the HTTP protocol connection; and
the web application at the client device determines an actual data rate of transmission of the pushed resources based on the notification or notifications received through the Web Socket connection.

21. The method of claim 20, wherein the sending of a probing message is in response to a user request for changing a quality of resources at the client device.

22. The method of claim 20, wherein the pushing information includes a start of the push of the resources, and the actual data rate is calculated by the client device based on the time of reception of the push start notification and an estimated time of end of push.

23. The method of claim 20, further comprising, at the client device, sending a request to the server device to upgrade a quality of new resources to be pushed to a higher quality than a quality of said pushed resources.

24. The method of claim 23, wherein the higher quality is the highest quality below a quality corresponding to the determined actual data rate, from a plurality of qualities at which resources are available.

25. The method of claim 20, wherein a web application in the client device queries the pushed resources to a proxy.

26. A non-transitory computer-readable medium storing a program which, when executed by a microprocessor or computer system in a device of a communication network, causes the device to perform the steps of the method of claim 1.

27. A server device in a communication network, comprising: a tangible communication interface configured for receiving a message from a client device based on which the server device determines resources to push to the client device using an HTTP protocol connection; and for receiving a probing message from the client device requesting the server device to enter a probing mode; probing mode circuitry configured, when the server device is in the probing mode, for pushing, to the client device, the determined resources, using the HTTP protocol connection and a target data rate; and for notifying the client device of pushing information using a Web Socket connection established between a client application in the client device and a server application in the server device, thereby enabling a web application running in a web browser of the client device to determine an actual data rate of transmission of the pushed resources, the Web Socket connection being separate from the HTTP protocol connection.

28. A client device comprising: a web application running in a web browser; a tangible communication interface configured for sending an HTTP message to a server device enabling it to determine resources to push to the client device using an HTTP protocol connection; and for sending a probing message to the server device requesting it to enter a probing mode; the web application at the client device being configured for, while the server device is in the probing mode: receiving, from the server device, pushed resources using the HTTP protocol connection and at least one notification of pushing information using a Web Socket connection established between a client application in the client device and a server application in the server device, the Web Socket connection being separate from the HTTP protocol connection; and determining an actual data rate of transmission of the pushed resources based on the notification or notifications received through the Web Socket connection.

* * * * *